Jan. 5, 1926.　　　　　　　　　　　　　　　1,568,153
K. P. GOTTSCHALK
MATCH MAKING MACHINE
Filed March 23, 1923　　　　2 Sheets-Sheet 2

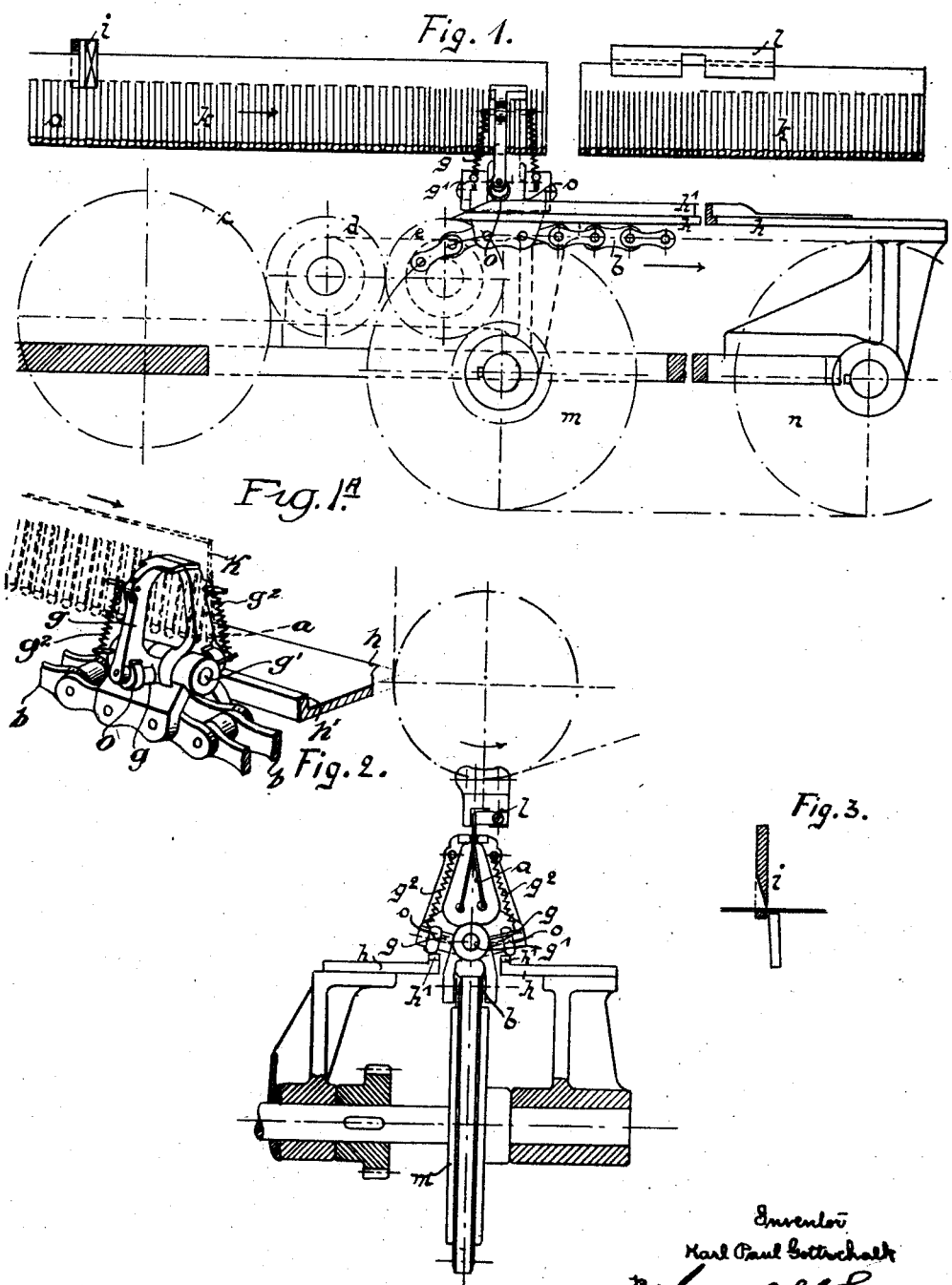

Inventor
Karl Paul Gottschalk

Patented Jan. 5, 1926.

1,568,153

UNITED STATES PATENT OFFICE.

KARL PAUL GOTTSCHALK, OF DRESDEN, GERMANY, ASSIGNOR, BY MESNE ASSIGNMENTS, TO THE DIAMOND MATCH COMPANY, OF CHICAGO, ILLINOIS, A CORPORATION OF ILLINOIS.

MATCH-MAKING MACHINE.

Application filed March 23, 1923. Serial No. 627,232.

*To all whom it may concern:*

Be it known that I, KARL PAUL GOTTSCHALK, a subject of the Republic of Saxony, German Republic, and residing at 19 Reicherstrasse, Dresden, Republic of Saxony, German Republic, have invented an Improvement in Match-Making Machines, of which the following is a specification.

The present invention has for its object a match making machine and especially a device for introducing the separate strips cut from a continuous band or web into the grippers arranged on an endless traveling link-chain for the purpose of drying said cut strips, of releasing them after their drying operation and delivering them onto an endless band or web.

In the drawing:

Fig. 1 is a longitudinal elevation of a device embodying the features of my invention as illustrated for a match making machine.

Fig. 1ª is a detail, in perspective, of the gripper, a portion of the carrying chain therefor, and adjuncts, indicating in dotted lines a part of a match strip as engaged by the gripper preparatory to the endwise movement of the strip into engagement with a clamp of an adjacent conveyer.

Fig. 2 is a front elevation partly in section.

Fig. 3 is a detail of the cutter, and

Figure 4:
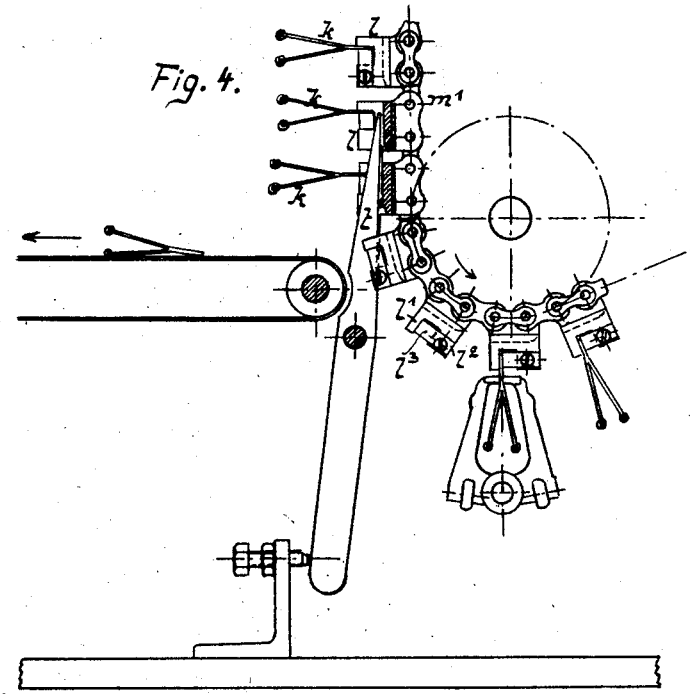
Figs. 4 and 5 show in longitudinal and front elevation the conveying device used for drying the match strips.

$a$ is a continuous band or web of matches progressing longitudinally from the splint forming and dipping instrumentalities of a match making machine and across the path of a cutting device $i$ which is operative to sever the leading end of the web or band transversely into successive strips $k$ of predetermined length. These strips may be guided in any suitable manner or run onto a support to be therafter seized by a gripper element which pulls the strip bodily lengthwise and into engaging relation with a clamp element $l$, hereinafter described, positioned in longitudinal alignment with the strip.

The gripper element herein shown comprises a pair of complementary jaws $g$ pivotedly supported by a pin $g'$ extending through bosses on a bracket $g^3$ which is secured to and carried by an endless chain $b$. This chain is supported and driven by suitably disposed wheels $m$, $n$ in such a manner that the upper run of the chain is directly below and parallel to the strip. The jaws are maintained normally in open position by means of springs $g^2$ secured thereto and to outwardly projecting pins on the brackets $g^3$, and hence as the open jaws are carried by the chain from horizontal to vertical position the jaws receive and embrace the leading end of the strip. Thereupon the jaws are automatically closed so as to seize the interposed strip and carry it bodily into the clamp element $l$, as will now be described.

Suitably supported immediately above the upper horizontal run of the chain $b$ is a horizontal bed $h$ having a median longitudinal slot therein for the free passage of the traveling gripper jaws, and having along the respective sides of the slot two parallel rails $h'$. These rails extend from the forward or left hand end of the bed, (where they as well as the bed are downwardly beveled) to a point beyond the clamp element $l$, where the rails are curved or beveled to a portion thereof on a lower level. In the lower parts of the gripper jaws are journaled rollers $o$ which are so arranged as to run upon and along the respective rails as the grippers are being carried rearward by the chain. As the rollers approach the higher level of the rails they are cammed upward by the opposing beveled surfaces in a manner to close the gripper jaws firmly against the interposed strip; and as the rollers continue their progress along such higher level the jaws are held in closed position and, in consequence, they carry the strip longitudinally into the opposing clamping element $l$. This done, the rollers escape the higher level of the rails, the jaws resume their normal open condition, and the strip is retained by the clamping device; whereupon such device, with the match strip therein, is removed and another similar clamping device is positioned to receive a succeeding match strip, and so on. The clamping devices are fastened at regular intervals apart on an endless chain carrier $m$ of suitable length which is intermittently moved in any usual or approved manner.

The chain wheels $m$, $n$ are driven by the tooth wheels $c$, $d$, $e$ at such a speed that the grippers or jaws $g$ themselves in comparison with the speed of the continuous band or web $a$ move for instance with a triple speed, so that a certain distance is produced between the separate strips $k$ to be introduced into the clamping device $l$ and the continuous match web, whereby a removal of the strip takes place without allowing the continuously following or succeeding match web $a$ to strike against the separately cut strip $k$.

In the arrangement of the device represented in Fig. 1 a pair of grippers or jaws $g$ is arranged on the endless chain $b$ and the speed of the latter is so controlled that the cut separate strips $k$ are permanently seized by the grippers or jaws at the forward end of each strip.

Without departing from the nature of the present invention an endless chain $b$ of larger length, for instance of double length may be used. In this case and in correspondence therewith, two pairs of grippers or jaws are fastened on the chain which seize the separate strips $k$ after each other.

Figure 5:
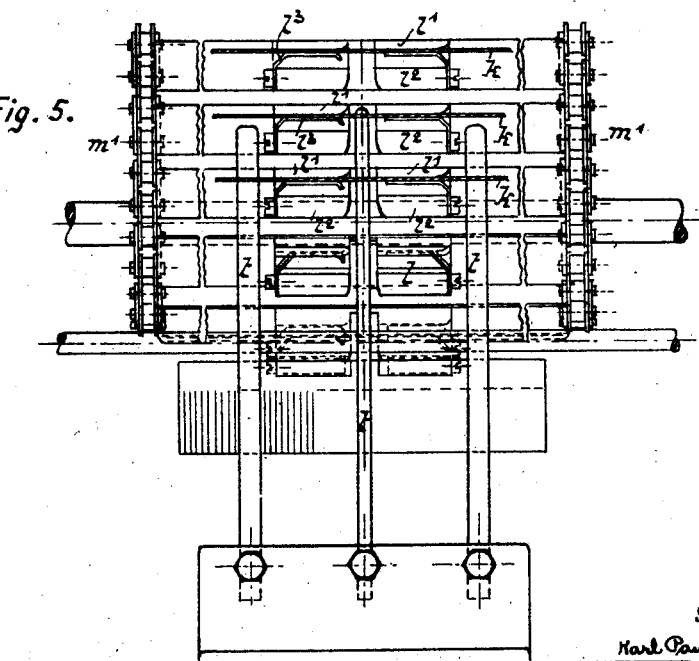

As clearly seen in Figs. 4 and 5, the clamping devices $l$ are formed by two guide bars $l^1$, $l^2$ between which one or two plate springs $l^3$ are arranged. Said plate springs are curved or bent in such a manner that the separate strips $k$ are easily introduced between one of the guide bars and the plate springs and held by the said springs.

The separate clamp members $l$ are fastened on the endless chains $m^1$ of suitable length for drying the match strips during the complete movement of the slow traveling chain. In this manner the match strips $k$ are fully dried during their travel from their entrance into the clamping members $l$ until their delivery out of said members and onto an endless band. The automatic delivery of the separate strips $k$ from the clamping members $l$ takes place by several wedge-shaped fingers $t$ which lie or are inserted between the ends of the separate strips and one of the guide bars of the clamping members $l$ and cause a gradual removal of the single separate strips from the clamping members.

I claim as my invention:

1. In a match making machine having means for transversely cutting a continuous web of matches into succeeding strips, an endless conveyer, including a succession of clamp elements, movable in a path adjacent the leading end of each strip and operable to position a clamp element in longitudinal alignment with the strip, a gripper element, means for supporting said gripper element and moving it in a path transversely of the conveyer and longitudinally of each succeeding strip and the adjacent clamp element, and means for periodically actuating the said gripper element whereby it is caused to seize the strip, move it lengthwise and into the grasp of the adjacent clamp element of the conveyer, and then release the strip.

2. In a match making machine having means for transversely cutting a continuous web of matches into succeeding strips, an endless conveyer, including a succession of clamp elements, movable in a path adjacent the leading end of each strip and operable to position a clamp element in longitudinal alignment with the strip, a gripper element comprising jaws adapted to embrace and seize each succeeding strip and move it in a path transversely of the conveyer and longitudinally of the strip and the clamp element, an endless chain supporting said gripper element, means for moving said chain, and means for periodically actuating said gripper element whereby it is caused to seize the strip, move it lengthwise and into the grasp of the adjacent clamp element of the conveyer, and then release the strip.

3. In a match making machine having means for transversely cutting a continuous web of matches into succeeding strips, an endless conveyer, including a succession of clamp elements, movable in a path adjacent the leading end of each strip so as to position a clamp element in longitudinal alignment with the strip, a gripper element, means for supporting said gripper element and moving it upwardly into embracing relation with the strip and then in a path longitudinally of the strip and toward the adjacent clamp element, and means for periodically actuating the gripper element whereby it is caused to seize each succeeding severed strip, move it lengthwise and into the grasp of the adjacent clamp element of the conveyer, and then release the strip.

4. In a match making machine having means for transversely cutting a continuous web of matches into succeeding strips, an endless conveyer, including a succession of clamp elements, movable in a path adjacent the leading end of each strip so as to position each clamp element in longitudinal alignment with the strip, a gripper element, means for supporting said gripper element and moving it upwardly into embracing relation with the strip and then in a path longitudinally of the strip and toward the adjacent clamp element, the speed of such longitudinal movement of the gripper element exceeding that of the web, means for periodically actuating the gripper element whereby it is caused to seize each succeeding severed strip, move it lengthwise and into the grasp of the adjacent clamp element of the conveyer, and then release the strip.

In testimony that I claim the foregoing as my invention I have signed my name this 23rd day of February, 1923.

KARL PAUL GOTTSCHALK.